US006527305B1

(12) United States Patent
Smith

(10) Patent No.: US 6,527,305 B1
(45) Date of Patent: Mar. 4, 2003

(54) FUEL LINE COUPLING SYSTEM

(76) Inventor: Kenneth Robert Smith, 54 Billett Lane, Berkhamstead HP4 1DR (GB)

(*) Notice: Subject to any disclaimer, the term of this patent is extended or adjusted under 35 U.S.C. 154(b) by 0 days.

(21) Appl. No.: 09/670,434

(22) Filed: Sep. 26, 2000

(51) Int. Cl.[7] ................................................ F16L 35/00
(52) U.S. Cl. ........................................ 285/914; 285/24
(58) Field of Search ................................ 285/914, 330, 285/913, 20, 24, 408

(56) References Cited

U.S. PATENT DOCUMENTS

| | | | | | |
|---|---|---|---|---|---|
| 2,307,275 A | * | 1/1943 | Johnson | 285/330 X |
| 3,287,031 A | * | 11/1966 | Simmons et al. | 285/914 X |
| 4,150,673 A | * | 4/1979 | Watt | 285/914 X |
| 4,211,439 A | * | 7/1980 | Moldestad | 285/914 X |
| 4,907,019 A | * | 3/1990 | Stephens | 285/914 X |
| 5,401,062 A | * | 3/1995 | Vowles | 285/24 X |

FOREIGN PATENT DOCUMENTS

| | | | | |
|---|---|---|---|---|
| GB | 2343492 | * | 5/2000 | |
| JP | 1220793 | * | 9/1989 | 285/24 X |

* cited by examiner

*Primary Examiner*—Lynne H. Browne
*Assistant Examiner*—David E. Bochna
(74) *Attorney, Agent, or Firm*—Galgano & Burke

(57) ABSTRACT

A fuel line coupling system for coupling a fluid fuel transportation tanker to a fuel supply tank and subsequently to a fuel destination depot tank, the system including a supply tank fuel transfer coupling component; a tanker fuel transfer coupling component to couple with the supply tank's coupling component for transfer of fuel to the tanker; and a depot fuel transfer coupling component to couple to the tanker fuel transfer coupling component for delivery of fuel from the tanker to the destination depot tank. The tanker coupling component has an adjustable setting fuel type designator device and each of the supply coupling components and depot coupling component have a respective fuel type identifier each of which identifier device is adapted to operatively interact with the fuel type designator device electronically or mechanically to prevent coupling or fuel transfer and/of warm the driver against coupling if the destination depot tank coupling component fuel type indicator device and the supply tank coupling component fuel type identifier device are incompatible.

8 Claims, 3 Drawing Sheets

FUEL LINE COUPLING SYSTEM

FIELD OF THE INVENTION

The present invention concerns improvements in and relating to fuel line coupling systems and, in particular, the couplings between a static supply tank and a transportation tanker and between the transportation tanker and a static destination depot tank.

BACKGROUND TO THE INVENTION

In the developed world vast quantities of petroleum-based fuels are consumed annually by the automotive industry and petrol stations are extremely widespread and commonplace. These petrol stations have to be restocked with fuel by extensive fleets of fuel transportation tankers.

With the very high level of transport and distribution activity, it is inevitable that delivery mistakes frequently occur.

It is estimated that the UK petroleum-based fuel transport and distribution industry loses millions of pounds every year as a result of mistakes being made in fuel delivery where one type of fuel is accidentally fed into a tank containing another type of fuel leading to cross-contamination of one fuel by the other. Where this happens the general remedy is simply to pump out the mixed fuel and ship it back to an oil refinery for regrading by redistillation. A great deal of money is expended in the pumping out and regrading of the fuel. Furthermore, as a general rule, a tanker driver who accidentally mixes fuels is summarily dismissed and a new driver needs to be trained to replace him further increasing the overall costs.

It is a general objective of the present invention to provide a solution to this profound problem that dogs the fuel transport and distribution industry.

SUMMARY OF THE INVENTION

According to a first aspect of the present invention there is provided a fuel line coupling system for coupling a fluid fuel transportation tanker to a fuel supply tank and subsequently to a fuel destination depot tank, the system comprising a supply tank fuel transfer coupling component; a tanker fuel transfer coupling component to couple with the supply tank's coupling component for transfer of fuel to the tanker; and a depot fuel transfer coupling component to couple to the tanker fuel transfer coupling component for delivery of fuel from the tanker to the destination depot tank, wherein the tanker coupling component has an adjustable setting fuel type designator means and each of the supply coupling components and depot coupling component have a respective fuel type identifier means each of which identifier means is adapted to operatively interact with the fuel type designator means to physically prevent coupling when the destination depot tank coupling component fuel type identifier means and the supply tank coupling component fuel type identifier means are incompatible;

the identifier means each being provided at or near the coupling end of the respective coupling component and comprising an identifying physical feature, for example one or more pins, that co-operatively engages with a complementary physical feature, for example one or more corresponding sockets, on the fuel type designator means; and the fuel type designator means being provided at or near the coupling end of the tanker coupling component and adjustable to alter the complementary physical feature that is presented for co-operative engagement, to thereby enable the designator means to be set for a required fuel type and only allow coupling together of the tanker coupling component with a supply tank or depot fuel transfer coupling component when the fuel type designator means and fuel type identifier means are compatible and can co-operatively engage with each other.

Preferably the designator means comprises an annular plate that is rotatably mounted to the tanker fuel transfer coupling component, whereby rotation of the annular plate adjusts the setting of the fuel type designator means.

The annular plate is suitably mounted to the tanker fuel transfer coupling component held captive on a neck portion of the coupling component but having a degree of freedom of movement longitudinally of the neck of the coupling to selectively enable the annular plate to be rotated.

Preferably the annular plate is held in register against a stop on the neck portion by the biasing action of resilient biasing means, whereby rotation of the annular plate is enabled by pushing the annular plate against the action of the resilient biasing means.

Advantageously, the annular plate may be secured in different selection rotational positions by means of splines and complementary keyways at different radial orientations around the neck portion of the tanker fuel transfer coupling component.

Preferably each of the fuel supply fuel transfer coupling component and the depot fuel transfer coupling component have an array of locating pins to locate in sockets provided in the annular plate on the transporter fuel transfer coupling component.

Preferably the supply tank fuel transfer coupling component or the depot tank fuel transfer coupling component is formed at one end of a hoze, the other end of which is coupled to the respective tank.

Where the end of the hoze that is coupled to the respective tank is detachable from the tank it suitably has a fuel type identifier means thereon comprising an identifying physical feature that cooperatively engages with a complementary physical feature on the fuel tank so that the hoze couples only to a tank of the appropriate fuel type.

In this case, one or both of the fuel type identifier means at the tank coupling end of the hoze or the complimentary physical feature of the tank could be adjustable to enable them to be set for a different type of fuel.

According to a second aspect of the present invention there is provided a tanker fuel transfer coupling component which is suitable for use in the first aspect of the present invention and which is characterised in that it has an adjustable setting fuel type designator means which operatively interacts with a fuel type identifier means of a coupling component of the first aspect of the invention.

BRIEF DESCRIPTION OF THE DRAWINGS

A preferred embodiment of the present invention will now be more particularly described, by way of example, with reference to the accompanying drawings, wherein.

DESCRIPTION OF THE PREFERRED EMBODIMENT

Referring to the Figures, the illustrated coupling comprises a first coupling component 1 to enable supply of petroleum from a static supply tank (not shown), which supply tank would normally be located on or close to the premises of an oil refinery.

Figure 1A:
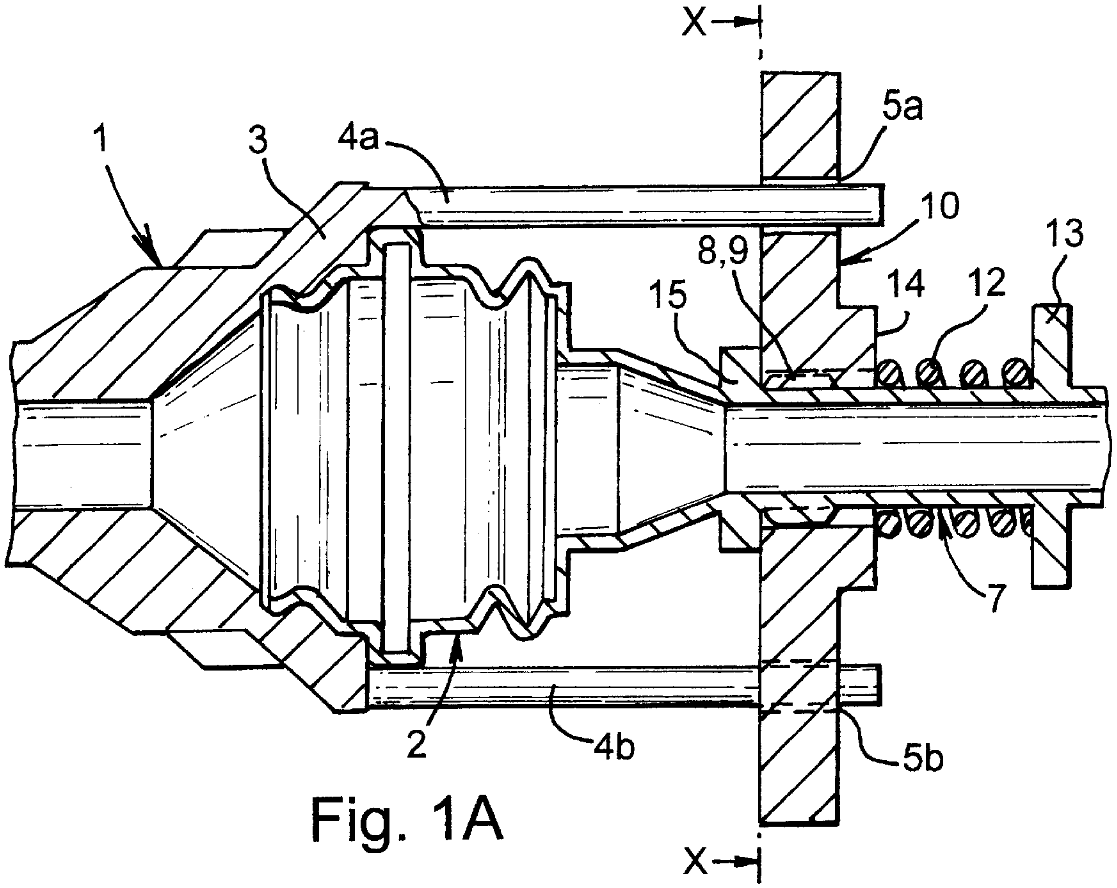
FIG. 1A is a longitudinal sectional view of a coupling in accordance with the first preferred embodiment of the invention.

This coupling component 1 may be an integral part of the outlet of the supply tank but is preferably of a type known generally as an API adapter that is formed at one end of a hoze that is coupled to the outlet of the tank and it is designed to co-operatively engage with a complementary API adapter 2 of a fuel transportation tanker. The API adapters 1 of the supply tanks generally have a cup shaped outer portion 3 which will envelop the leading edge portion of the corresponding API adapter 2 of the fuel transportation tankers. This nesting coupling of supply tank API adapter 1 and tanker API adapter 2 is illustrated in FIG. 1A.

In contrast to conventional API adapters, those illustrated here have a number of important modifications.

Firstly, the supply tank adapter 1 has a circumferential array of four locating pins 4*a–d* extending longitudinally from the rim of the cup-shaped outer portion 3. These are designed to slot into corresponding sockets 5*a–d* provided in an annular plate 10 that is adjustably mounted on a neck portion 7 of the tanker API adapter 2.

The locating pins 4*a–d* may penetrate the corresponding sockets 5*a–d* only if they are correctly aligned.

The pins 4*a–d* are fixed in their positioning by virtue of the rigidity of the supply adapter 1 and its associated pipe work which lacks any significant ability to rotate about its axis. However, the position of the sockets 5*a–d* may be adjusted by rotation of the annular plate 10 about the neck portion 6 of the tanker API adapter 2.

The annular plate 10 may be rotated between different selected angular positions by sliding the plate 10 back along the neck portion 7 against the action of a return spring 12 that extends between a shoulder 14 of the plate 10 and a flange 13 on the neck portion 7. The spring 12 presses the plate 10 against a shoulder 15 on the neck portion 7.

In order that the annular plate 10 may be held firmly at selected angular positions reliance could be placed upon friction with the spring 12. However, for greater reliability, the plate 10 is suitably splined to the neck portion 7, as illustrated.

Figure 1B:
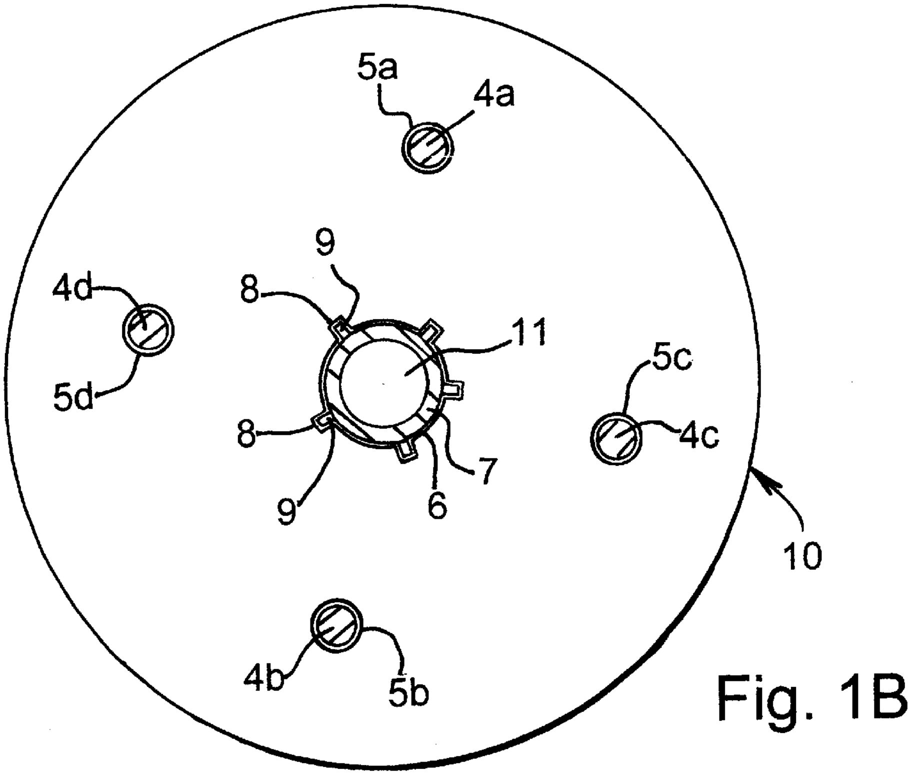
FIG. 1B is a transverse sectional view taken along the line X—X of FIG. 1A.
Figure 2:
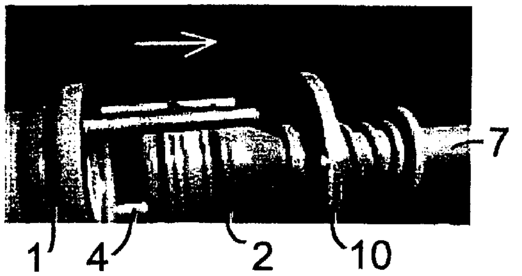
FIGS. 2 to 8 are computer-generated perspective images of the progressive stages of adjusting the setting of the fuel type designator means of the tanker coupling component to enable the tanker coupling component to couple to the fuel supply coupling component for fuel transfer. This only allows fuel transfer once the designator means has been set to the appropriate fuel type designation.
Figure 3:
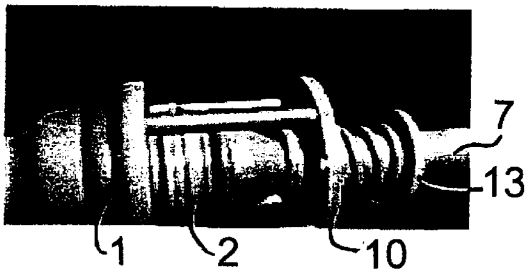

Referring to FIG. 1B, the plate 10 has a number of keyways 8 machined in its axial bore 6 to co-operatively engage with complementary splines 9 on the neck portion 7 to hold the plate 10 at each different chosen rotational position.

Figure 4:
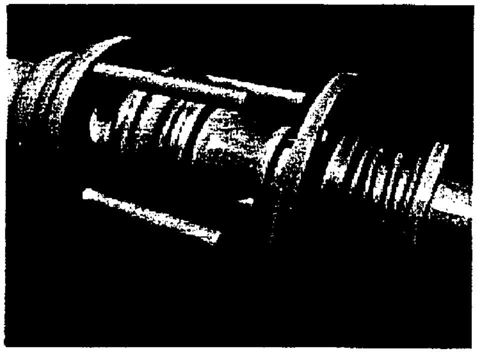
Figure 5:
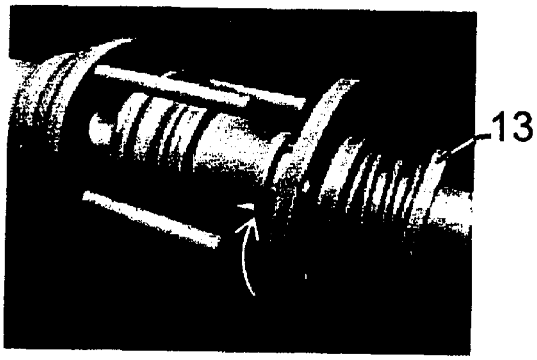
Figure 6:
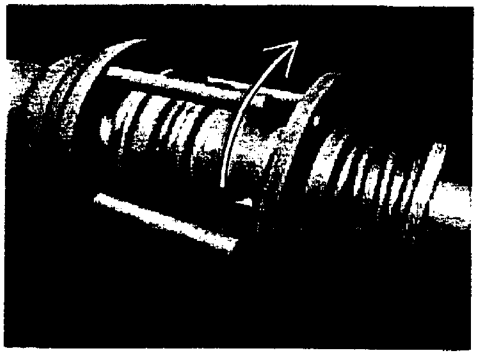
Figure 7:
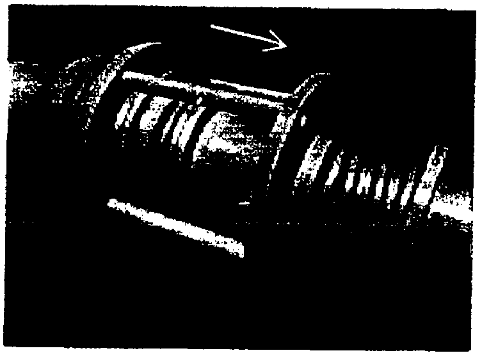
Figure 8:
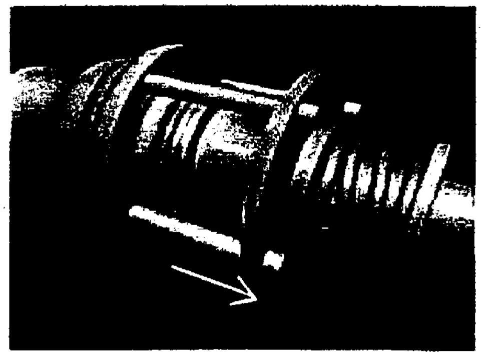

The plate 10, in order to be turned, must be backed off by a sufficient distance to disengage the keyways 8 and splines 9 as illustrated in FIG. 4. Rotation of the annular plate 10 brings the sockets 5*a–d* into line with the locating pins 4*a–d* as illustrated in FIGS. 5 and 6.

Each different selected rotational position of the annular plate 10 may serve as a different setting that enables the tanker API adapter 2 to exclusively couple to a supply API adapter 1 that has an array of locating pins 4*a–d* to specifically complement the positions of the sockets 5*a–d* at that setting of the annular plate 10.

Hence, for example, a first supply API adapter 1 for four star petrol may be provided with four pins 4*a–d* that are arranged in pairs horizontally and vertically. Another supply API adapter 1 for unleaded petrol may be provided with four pins 4*a–d* that are arranged in pairs in generally the same spatial configuration but out of phase relative to the first adapter 1 by, for example, 30°. Accordingly, in this example, with the annular plate 10 of the tanker adapter 2 at a first rotational setting, it will allow coupling only with the first adapter 1 to transfer four star fuel to the tanker.

Alternatively, at a second setting, having been rotated through 30°, it will only allow coupling with the second adapter 2 to transfer unleaded fuel to the tanker.

Although not specifically illustrated, the plate 10 is preferably clearly marked with indicators of the fuel type of each setting. For ease of handling and reduction of materials costs the plate 10 suitably has cut-outs, being large radial segment shaped holes in its redundant surface area. The rotatable annular plate 10 is, in broad terms, a mechanical device mounted to the tanker's coupling component 2 that serves as an adjustable fuel type designator means which must be set to a setting corresponding to the fuel type of the fuel supply tank before coupling is effective and before fuel can be transferred to the tanker.

This, however, represents only half of the process. The fuel type designator means has a particularly important role to play when the fuel transportation tanker reaches the destination depot—i.e. the destination petrol station. This is where the majority of fuel transfer mistakes normally occur.

In order to avoid accidental unloading of the fuel from the fuel transportation tanker into the wrong destination depot tank, the coupling component of each destination depot tank is suitably modified to have an array of locating pins corresponding to the pins of the supply tank coupling components for that same type of fuel. Accordingly, just as the setting of the fuel type designator means prevents the tanker coupling component from coupling with anything but a complementary supply tank coupling component with the same pin array, the designator means 10 also prevents coupling of the transportation tanker coupling component to the wrong destination depot tank coupling component.

In the foregoing description the manner of coupling of the tank coupling component to the tanker coupling component has been described in detail. Where the tank coupling component is formed at one end of a hoze, the other end of the hoze may be integrally formed or assembled on the supply tank. Alternatively, however, the hoze may be detachable from the tank. Where this is the case it is clearly desirable to further provide that the coupling of the hoze to the tank can also be made fuel product specific by incorporating a fuel type identifier means on the end of the hoze that couples to the tank. Two arrangements illustrating this are shown in FIGS. 9 and 10.

Figure 9:
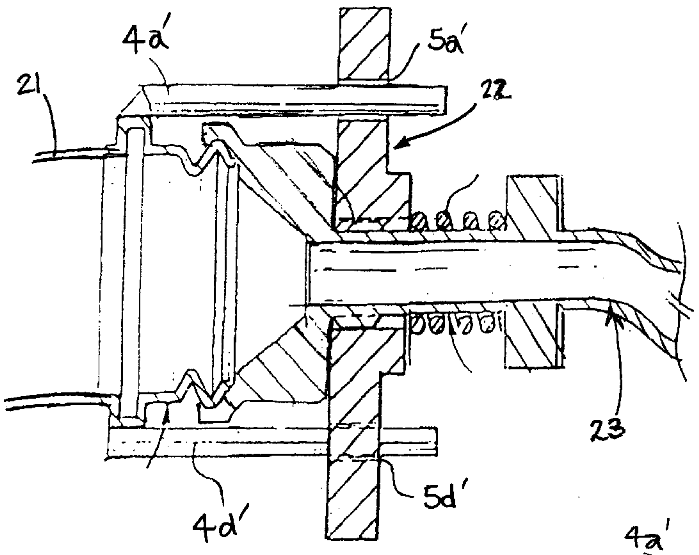
FIGS. 9 and 10 are, respectively, longitudinal sectional views of the end of a fuel delivery hoze that couples to a fuel supply tank or fuel depot tank, with the FIG. 9 embodiment having an adjustable configuration of fuel type identifier means and the FIG. 10 embodiment having a static configuration of fuel type identifier means.
Figure 10:
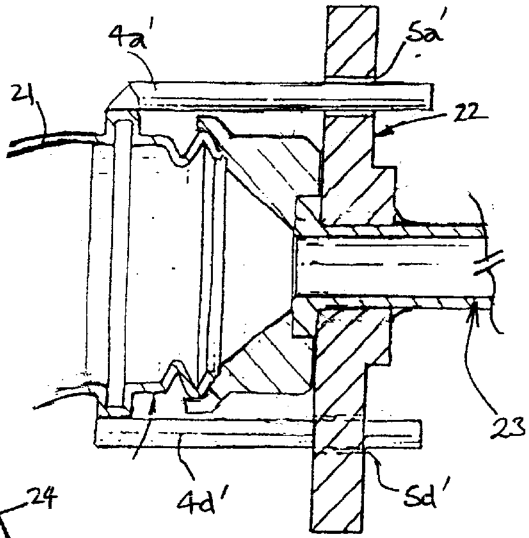

Referring to FIG. 9, the tank inlet/outlet 21 is provided with an array of locating pins 4*a*'–4*d*' projecting forwardly of the opening of the inlet/outlet 21. These locating pins 4*a*'–4*d*' cooperatively, engage, in use, with corresponding sockets 5*a*'–5*d*' in an annular plate 22 that is mounted as a collar over the hoze 23.

The annular plate 22 with the sockets 5*a*'–5*d*' for the locating pins 4*a*'–4*d*' has a configuration substantially the same as the configuration of the fuel type designating means of the fuel tanker that is illustrated in FIG. 1A but instead of being a part of the fuel tanker it forms a part of the hoze 23 at the other end of the hoze 23 from the APV coupling 1.

In the FIG. 9 embodiment of coupling of the hoze 23 to the tank 21, the annular plate 22 is rotationally adjustable to alter its configuration, if necessary. Adjustable settability of the annular plate 22 gives greater flexibility in the use of the hoze 23 to couple to different fuel tanks, if necessary. Importantly, however, the driver of the fuel tanker would not normally be authorised to make any adustment to the setting of the coupling of the hoze 23 to the tank inlet/outlet 21 and this should normally be set at the same setting as the coupling 1, 10 between the hoze APV and the tanker coupling component 2.

For most uses it is sufficient to have the annular plate 22 fixed in a static arrangement on the hoze 23, as illustrated in FIG. 10.

Figure 11:
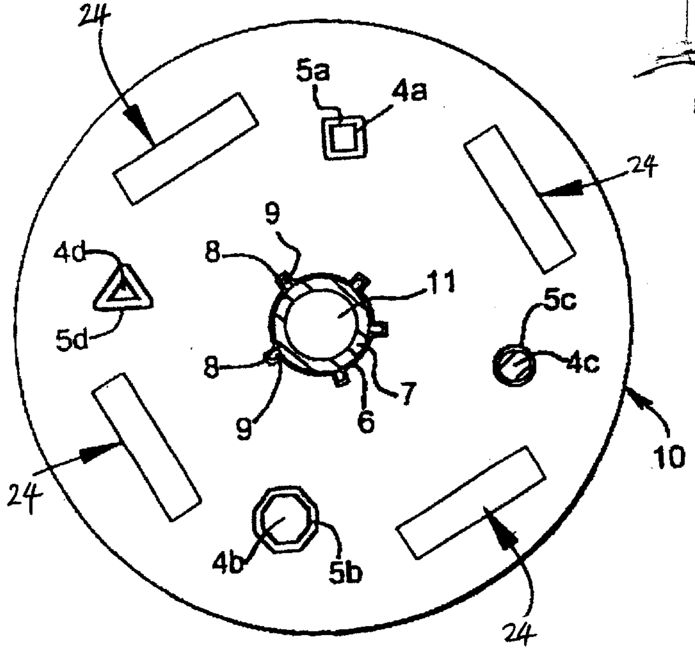
FIG. 11 is a view similar to that of FIG. 1B but in which the fuel type designator means has a range of differently shaped sockets for differently shaped locating pins.

Referring now to FIG. 11, this illustrates a diverse range of differently shaped locating pins 4*a*–4*d* and corresponding 5*a*–5*d*. Any cooperating shapes of pin 4 and socket 5 may be selected.

Also illustrated in FIG. 11 is the provision of hand grip slots 24 spaced at intervals around the circumference of the annular plate 10.

What is claimed is:

1. A fuel line coupling system for coupling a fluid fuel transportation tanker to a fuel supply tank and subsequently to a fuel destination depot tank, the system comprising a supply tank fuel transfer coupling component; a tanker fuel transfer coupling component to couple with the supply tank's coupling component for transfer of fuel to the tanker; and a depot fuel transfer coupling component to couple to the tanker fuel transfer coupling component for delivery of fuel from the tanker to the destination depot tank, wherein the tanker coupling component has an adjustable setting fuel type designator means and each of the supply coupling components and depot coupling component have a respective fuel type identifier means each of which identifier means is adapted to operatively interact with the fuel type designator means to physically prevent coupling when the destination depot tank coupling component fuel type identifier means and the supply tank coupling component fuel type identifier means are incompatible; the fuel type identifier means each being provided at or near the coupling end of the respective coupling component and comprising an identifying physical feature that co-operatively engages with a complementary physical feature on the fuel type designator means and the fuel type designator means being provided at or near the coupling end of the tanker coupling component and in such a way as to be adjustable while mounted to the tanker coupling component to alter the complementary physical feature that is presented for co-operative engagement, to thereby enable the designator means to be set for a required fuel type and only allow coupling together of the tanker coupling component with a supply tank or depot fuel transfer coupling component when the fuel type designator means and fuel type identifier means are compatible and co-operatively engage with each other;

wherein the designator means comprises an annular plate that is rotatably mounted to the tanker fuel transfer coupling component, whereby rotation of the annular plate adjusts the setting of the fuel type designator means.

2. A fuel line coupling system as claimed in claim 1, wherein the annular plate is mounted to the tanker fuel transfer coupling component held captive on a neck portion of the coupling component but having a degree of freedom of movement longitudinally of the neck of the coupling to selectively enable the annular plate to be rotated.

3. A fuel line coupling system as claimed in claim 2, wherein the annular plate is held in register against a stop on the neck portion by the biasing action of resilient biasing means, whereby rotation of the annular plate is enabled by pushing the annular plate against the action of the resilient biasing means.

4. A fuel line coupling system as claimed in claim 2, wherein the annular plate may be secured in different selection rotational positions by means of splines and complementary keyways at different radial orientations around the neck portion of the tanker fuel transfer coupling component.

5. A fuel line coupling system as claimed in claim 1, wherein each of the fuel supply transfer coupling component and the depot fuel transfer coupling component have an array of locating pins to locate in sockets provided in the annular plate on the transporter fuel transfer coupling component.

6. A fuel line coupling system as claimed in claim 1, wherein one of said supply tank fuel transfer coupling component and said depot tank fuel transfer coupling component is formed at one end of a hose, the other end of which is coupled to the respective tank.

7. A fuel line coupling system as claimed in claim 6, wherein said end of said hose that is coupled to said respective tank is detachable from said tank and has a fuel type identifier means thereon comprising an identifying physical feature that cooperatively engages with a complementary physical feature on the fuel tank so that the hose couples only to a tank of the appropriate fuel type.

8. A fuel line coupling system as claimed in claim 7, wherein at least one of said fuel type identifier means at the tank coupling end of said hose and said complementary physical feature of the tank are adjustable to enable them to be set for a different type of fuel.

* * * * *